Feb. 5, 1929.
F. H. BUCKINGHAM
INDICATING DEVICE
Filed Nov. 1, 1924　　2 Sheets-Sheet 1
1,701,028
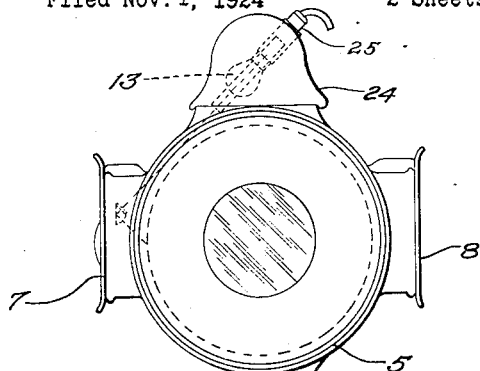
Fig. I.
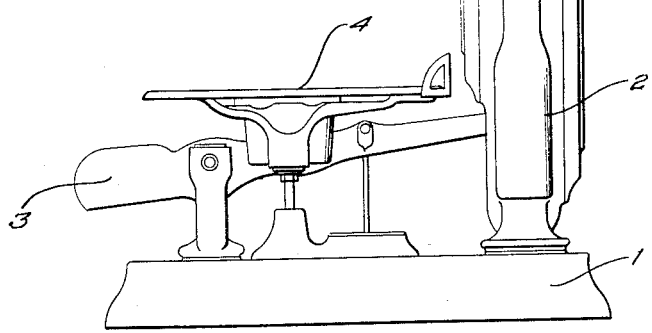
Fig. II.
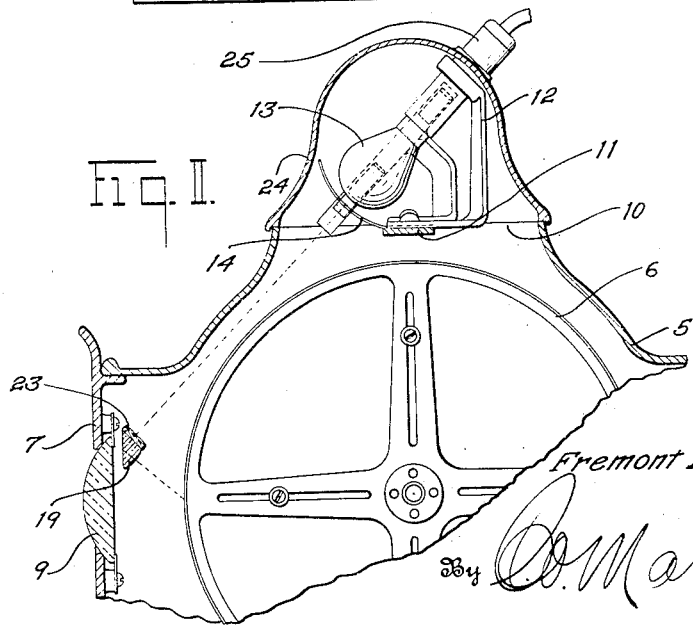
Inventor
Fremont H. Buckingham.
By W. Marshall
Attorney Feb. 5, 1929.  F. H. BUCKINGHAM  1,701,028
INDICATING DEVICE
Filed Nov. 1, 1924   2 Sheets-Sheet 2
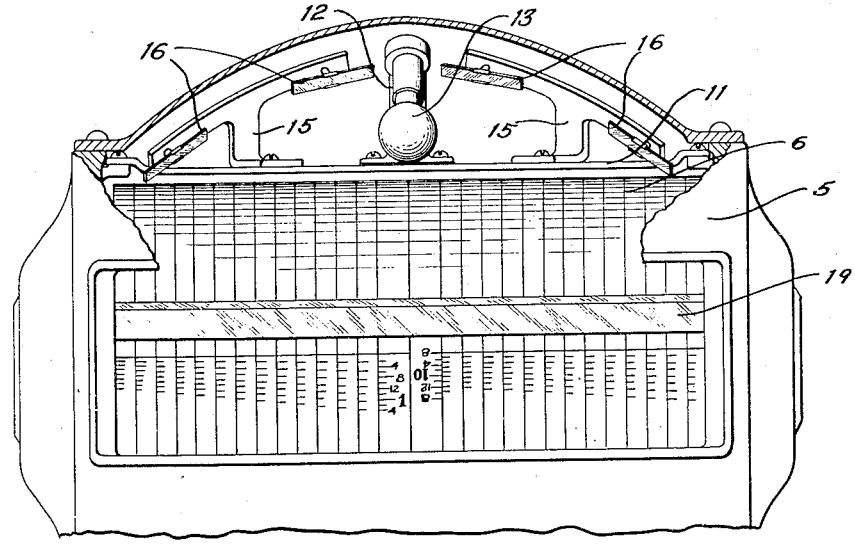
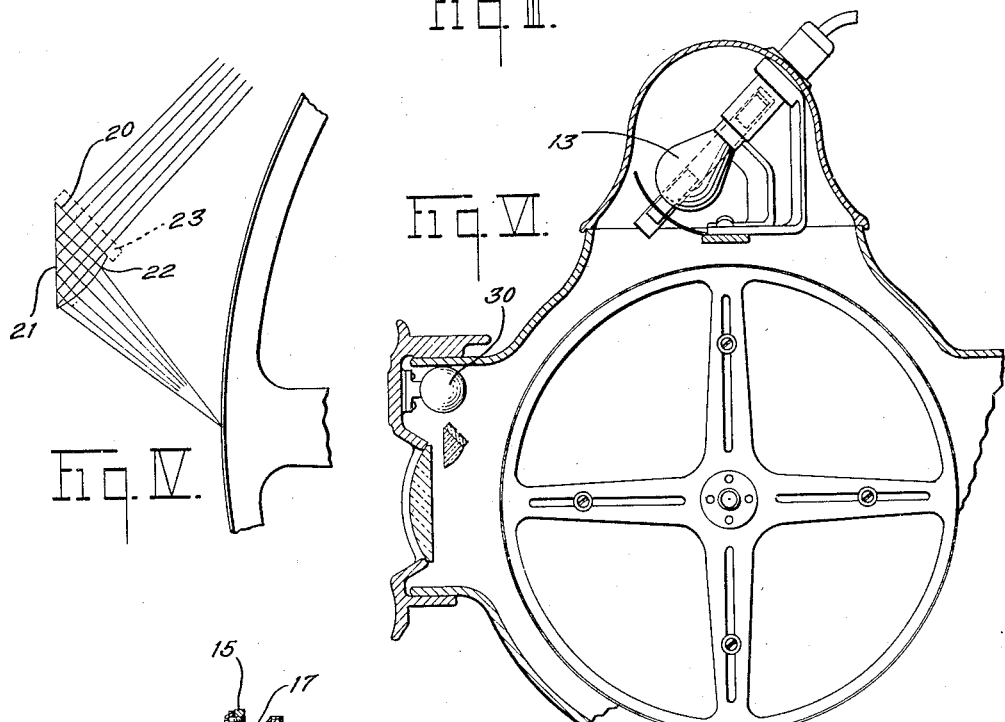
Inventor
Fremont H. Buckingham
By  BM Marshall
Attorney Patented Feb. 5, 1929.

1,701,028

UNITED STATES PATENT OFFICE.

FREMONT H. BUCKINGHAM, OF DETROIT, MICHIGAN, ASSIGNOR TO TOLEDO SCALE COMPANY, OF TOLEDO, OHIO, A CORPORATION OF NEW JERSEY.

INDICATING DEVICE.

Application filed November 1, 1924. Serial No. 747,400.

This invention relates to indicating means, and particularly to indicating devices in which a movable chart co-operates with a stationary index, as in weighing scales of the so-called cylinder type.

One of the principal objects of the invention is the provision of an index by means of which errors of parallax are prevented.

Another object is the provision of a device of the class to which this invention relates in which the index and the surface of the chart are coincident.

More specifically, it is an object of the invention to provide means for projecting a narrow line of light upon an indicating chart.

Another specific object is the provision of means for projecting such a line with substantially uniform brightness across a chart of considerable width.

Another object is the provision of a projecting device in which the line is projected upon the chart from the front, while the bulky part of the projecting device is located above the chart.

Another object is the provision of a device capable of being incorporated with the indicating mechanism of a weighing scale of the cylinder type without change in the weighing and indicating mechanism and without greatly changing the housing thereof.

Another object is the provision of a projecting device of the type described of the utmost simplicity and compactness.

Another object is the provision of a device of this kind which is simple and inexpensive in construction and which may be quickly and easily adjusted and in which the source of light is a standard electric lamp.

Other objects and advantages will be apparent from the following description, in which reference is had to the accompanying drawings illustrating preferred embodiments of my invention and wherein similar reference numerals designate similar parts throughout the several views.

In the drawings:—

Figure I is a side elevational view of a scale embodying my invention;

Figure II is an enlarged fragmentary sectional side elevation taken substantially through the center of the chart housing of the scale shown in Figure I, the path of a line of light being indicated by a broken line;

Figure III is an enlarged fragmentary front elevation of the part of a scale illustrated in Figure II, part of the housing being broken away;

Figure IV is a further enlarged diagrammatic view illustrating the operation of a reflecting lens, which is one of the elements of my invention;

Figure V is an enlarged sectional elevation showing an adjustable mirror support employed in carrying out my invention; and Figure VI is a fragmentary sectional elevational view of a cylindrical chart housing showing a form of my device in which flood illumination of the chart is provided.

Referring to the drawings in detail, the scale shown in Figure I is of a well-known type, having a base 1 upon one end of which is erected an upright casing 2 which contains automatic load-counterbalancing mechanism, a lever 3 carrying a commodity receiving platter 4 being fulcrumed upon the base 1 and extending into the casing 2, where it is connected to the automatic load-counterbalancing mechanism.

Surmounting the casing 2 is a housing 5 within which is rotatably mounted a cylindrical chart 6 having weight and value characters on its surface. The chart housing 5 is provided with front and rear windows 7 and 8 through which the chart may be read from the merchant's and customer's sides. The window 7 on the merchant's side of the scale is provided with a magnifying reading lens 9.

It is usual in scales of this kind to provide an index consisting of a wire or other line extending horizontally across the part of the chart which is visible through the magnifying reading lens, but since it is necessary, in order to avoid interference with the action of the scale, to place this line far enough away from the surface of the chart to insure clearance between the line and the chart at all times, errors of parallax result when the chart is read with the observer's eye above or below the level of the line. According to this invention the usual reading line is replaced by a line of light which lies directly on the surface of the chart and the apparent position of which is not changed with changes in the position of the observer.

In the form of invention illustrated, the top of the housing 5 is provided with an opening 10. Extending across the opening 10 from end to end of the housing 5 is a bar 11 at the center of which is mounted a lamp supporting bracket 12. A lamp 13 of the type commonly employed in automobile headlights, the filament of which is a small coil, is mounted in the bracket 12. The direct rays from the filament are prevented from falling upon the lens by means of a shield 14. Mounted upon the bar 11 at each side of the lamp supporting bracket 12 are mirror supporting brackets 15, to each of which is adjustably secured a pair of small elongated mirrors 16. Each of the mirrors 16 is angularly adjustable in all directions, being mounted by means of a ball and socket mounting 17 on the bracket 15 (see Figure V.) After the mirror is adjusted it is held in adjusted position by means of a clamp 18 which is held in place by screws that may be loosened when it is desired to adjust the mirror and tightened when it is desired to hold the mirror in adjusted position. The mirrors, as shown in Figure III, are each substantially tangent to a parabola having its focus at the lamp filament and its plane passing through a mirror lens 19 which is supported in front of the chart 6 adjacent the upper edge of the reading lens 9. Both the lens 9 and the mirror lens 19 are in the form of elongated members or bars. The mirror lens 19 may be described as a total reflecting prism having one side curved. The light from the mirrors enters the surface 20 of the lens which is turned toward the mirrors substantially perpendicularly and is totally reflected from the surface 21 and is refracted by the curved surface 22 to bring the light from the filament to a focus along the surface of the chart. Since the lens is curved in only one direction, the light is refracted in one direction only, and the image of the filament appears on the chart as a horizontal line. The distance from the filament to the chart via the mirrors and the lens is substantially the same for each point on the chart, and the line of light is, therefore, of substantially uniform brilliancy from end to end.

In order to make the line more conspicuous, a screen 23 of colored glass, preferably red, is placed over the surface 20. The light passing through this screen is red and the line on the chart, therefore, appears as a red line.

The sharpness of the line may be increased by stopping all the light except that which passes substantially through the center of the lens, a very efficient stop being provided by strips of opaque material overlying all of the colored screen 23 except a strip along its center.

The lamp and mirror mountings are covered and the opening 10 is closed by means of a cap 24 which may have an opening for a plug 25 so that the lamp 13 may be connected to a suitable source of current.

The form of device shown in Figure IV differs from that already described in that additional lighting means for the chart is provided. This additional lighting means consists of lamps 30 which are mounted in any convenient way to light up the chart with white light, or, if desired, the lamps 30 may be colored to enhance the contrast between the line of light from the lamp 13 and the flood light from the lamps 30.

The embodiments of my invention herein shown and described are to be regarded as illustrative only, and it is to be understood that the invention is susceptible to variation, modification and change within the spirit and scope of the subjoined claims.

Having described my invention, I claim:

1. In a weighing scale, in combination, a movable indicating chart, means for projecting upon said chart a line of light to serve as an index, and means for coloring the light so projected.

2. In a device of the class described, in combination, a chart, a source of light, an elongated lens, and means for reflecting said light through said lens to form a line of substantially uniform brilliancy upon said chart.

3. In a device of the class described, in combination, a chart, a source of light, and a combined reflecting prism and lens for reflecting and focusing light from said source in the form of a line upon said chart.

4. In a device of the class described, in combination, a chart, a source of light, a combined reflecting prism and lens for reflecting and focusing light from said source in the form of a line upon said chart, and means for coloring the light so reflected and focused.

5. In a device of the class described, in combination, an indicating chart, a source of light located away from the front of said chart, and a reflecting and focusing element located in front of said chart to focus light in the form of a line from said source upon said chart.

6. In a device of the class described, in combination, a chart, a source of light located away from the front of said chart, and a total reflecting prism having one side curved, said prism being arranged to reflect and focus light from said source in the form of a line on said chart.

7. In a device of the class described, in combination, a chart, a source of light located away from the front of said chart, a total reflecting prism having one side curved, said prism being arranged to reflect and focus light from said source in the form of a line on said chart, and a colored screen interposed between said source of light and said prism.

8. In a device of the class described, in combination, a chart, a source of light, mirrors to reflect light from said source in substantially parallel rays, and a reflecting and focusing element to receive said light and focus it in the form of a line upon the surface of said chart.

9. In a device of the class described, in combination, a source of light, a series of mirrors in parabolic formation thereabout, and a reflecting and focusing prism arranged to receive light from said source as reflected by said series of mirrors and focus said light in the form of a line upon the surface of said chart.

10. In a device of the class described, in combination, a source of light, a series of mirrors in parabolic formation thereabout, a reflecting and focusing prism arranged to receive light from said source as reflected by said series of mirrors and focus said light in the form of a line upon the surface of said chart, and a colored screen interposed between said source of light and said reflecting and focusing prism.

11. In a device of the class described, in combination, a source of light, a series of adjustably mounted mirrors in parabolic formation thereabout, and a reflecting and focusing prism arranged to receive light from said source as reflected by said series of mirrors and focus said light in the form of a line upon the surface of said chart.

12. In a device of the class described, in combination, a chart, a source of light, means for focusing light from said source upon said chart to form an index, means for coloring the light so focused, and means for flooding said chart with light of a contrasting color.

13. In a device of the class described, in combination, an indicating chart, a source of light, a prism for reflecting and focusing light from said source in the form of a line upon said chart, means for coloring the light so reflected and focused, and means for flooding said chart with light of a color contrasting with that of said line.

FREMONT H. BUCKINGHAM.